Sept. 1, 1931.   H. L. MILLER   1,821,846
COOLER
Filed Nov. 15, 1930
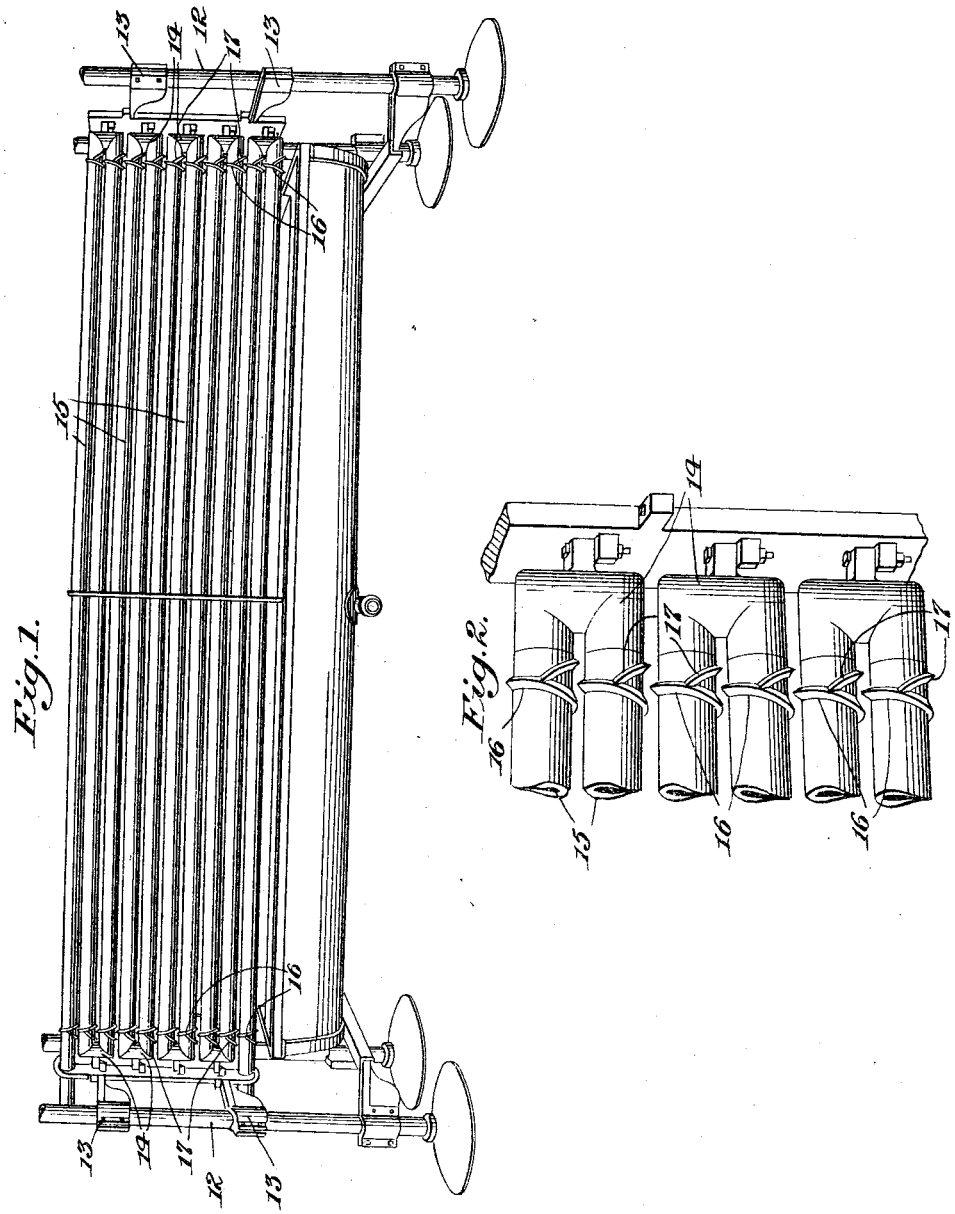

Patented Sept. 1, 1931

1,821,840

UNITED STATES PATENT OFFICE

HARRY L. MILLER, OF CHESTER, PENNSYLVANIA

COOLER

Application filed November 15, 1930. Serial No. 495,968.

This invention relates to that class of coolers known as "trickle" coolers in that coolers of this class each comprises a vertical series of horizontal tubes through which the cooling liquid is circulated and over which the liquid to be cooled is caused to flow from an upper feed pipe or trough and runs downward into a suitable trough or receptacle at the bottom of the cooler. In coolers of this class some objection has existed owing to the fact that the milk or other liquid being cooled had a tendency to run out to and drip from the ends of the tubes, and it has been proposed to obviate this objection by providing the tubes, near their outer ends, with inclined circumferential guard flanges to direct the liquid being cooled inward and prevent its escape from the ends of the tubes. These inclined guard flanges do not, however, always entirely prevent the liquid being cooled from running outward over said flanges. Moreover more or less water of condensation accumulates on the tubes, outside of the guard flanges and this water may drip down or otherwise enter the line of flow of the milk or other liquid being cooled. This is objectionable, particularly in cooling milk, as will be understood.

The present invention has for its object to obviate the objections just referred to, and this object is attained by providing the cooling tubes with what may be termed double guard flanges, or by providing, to co-operate with the inwardly inclined guard flanges, supplemental, outwardly inclined parts or flanges which will direct the water of condensation and any liquid which may overflow the inwardly inclined guard flanges outwards towards the ends of the cooling tubes. Thus when the cooler is being used in cooling milk any water of condensation, or any milk which may overflow the inwardly inclined guard flanges, and which may gather impurities from the outer end parts of the tubes, will be prevented from getting into the flowing milk line and adulteration or contamination of the milk will consequently be avoided.

In the accompanying drawings Fig. 1 is a general view of the lower part of a cooler embodying the present invention, and Fig. 2 is a detail view of a part of the same.

Referring to the drawings, 12 denotes standards provided with brackets 13 connected with the returns 14 of the cooling tubes 15, the connections between said brackets being preferably somewhat loose, as set forth in my application Serial No. 434,022, filed March 7, 1930, to accommodate expansion and contraction.

The cooler tubes 15 are provided near their outer ends with inwardly inclined circumferential guard flanges 16, to which are joined and from which extend outwardly inclined flanges 17. As clearly shown in the drawings these guard flanges are formed integral with the tubes 15, preferably by casting. Thus any milk or other liquid being cooled which may overflow the flanges 16 will be prevented from returning to the flow line, and any water of condensation which may accumulate on the end parts of the tubes outside of the flanges 16 will also be prevented from getting into the line of flow of the milk or other liquid being cooled, and contamination or adulteration of the liquid being cooled will be avoided by the outwardly inclined parts of the double flanges.

The invention is not to be understood as being limited to the exact construction of the guard flanges herein shown, as such construction may be varied, within the province of mechanical skill, without departing from the essence of the invention.

Having thus described my invention I claim and desire to secure by Letters Patent:

1. A cooler comprising a vertical series of horizontally disposed cooling tubes provided near each of their outer ends with inwardly and outwardly inclined guard flanges which are integral with said tubes.

2. A cooler comprising a vertical series of horizontally disposed cooling tubes provided near their outer ends with inwardly and outwardly inclined guard flanges, said outwardly inclined flanges being joined to and extending from the said inwardly inclined flanges.

In testimony whereof I affix my signature.

HARRY L. MILLER.